(12) United States Patent
Samuelsson et al.

(10) Patent No.: US 11,825,081 B2
(45) Date of Patent: *Nov. 21, 2023

(54) REFERENCE PICTURE LIST HANDLING

(71) Applicant: Telefonaktiebolaget LM Ericsson (publ), Stockholm (SE)

(72) Inventors: Jonatan Samuelsson, Enskede (SE); Rickard Sjöberg, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 64 days.

This patent is subject to a terminal disclaimer.

(21) Appl. No.: 17/537,710

(22) Filed: Nov. 30, 2021

(65) Prior Publication Data

US 2022/0094916 A1    Mar. 24, 2022

Related U.S. Application Data (63) Continuation of application No. 15/715,903, filed on Sep. 26, 2017, now Pat. No. 11,196,990, which is a
(Continued)

(51) Int. Cl.
*H04N 19/107* (2014.01)
*H04N 19/503* (2014.01)
(Continued)

(52) U.S. Cl.
CPC .......... *H04N 19/107* (2014.11); *H04N 19/31* (2014.11); *H04N 19/503* (2014.11); *H04N 19/70* (2014.11)

(58) Field of Classification Search
None
See application file for complete search history.

(56) References Cited

U.S. PATENT DOCUMENTS

| 9,049,449 B2 | 6/2015 | Wang et al. |
| 2004/0213473 A1 | 10/2004 | Ohira |

(Continued)

FOREIGN PATENT DOCUMENTS

| CN | 101189881 A | 5/2008 |
| CN | 101455084 A | 6/2009 |

(Continued)

OTHER PUBLICATIONS

Sjöberg, R., et al., "Absolute Signaling of reference pictures", Joint Collaborative Team on Video Coding (JCT-VC) of ITU-T SG16 WP3 and ISO/IEC JTC1/SC29/WG11, 6th Meeting, Torino, IT, Jul. 14, 2011, pp. 1-10, Version as of Jul. 1, 2011, Document: JCTVC-F493, WG11 No. m20923, XP30009516.

(Continued)

*Primary Examiner* — Peter D Le
(74) *Attorney, Agent, or Firm* — COATS & BENNETT, PLLC (57) ABSTRACT

An encoder is configured to encode a representation of a current picture of a video stream of multiple pictures. The encoder is further configured to encode, for each of a plurality of reference pictures included in a buffer description for the current picture, a respective one-bit flag according to one of two available values for the one-bit flag. The two available values for the one-bit flag include a first value explicitly indicating to a decoder to include the reference picture in a reference picture list for decoding the current picture. The two available values for the one-bit flag further include a second value explicitly indicating to the decoder not to include the reference picture in the reference picture list for decoding the current picture. The encoder is further configured to output the representation of the current picture and the one-bit flags.

20 Claims, 4 Drawing Sheets

Related U.S. Application Data continuation of application No. 13/704,227, filed as application No. PCT/SE2012/051030 on Sep. 27, 2012, now Pat. No. 9,807,386.

(60) Provisional application No. 61/540,628, filed on Sep. 29, 2011.

(51) Int. Cl.
*H04N 19/70* (2014.01)
*H04N 19/31* (2014.01)

(56) References Cited

U.S. PATENT DOCUMENTS

| | | |
|---|---|---|
| 2004/0218676 A1 | 11/2004 | Ha et al. |
| 2005/0053295 A1 | 3/2005 | Holcomb |
| 2006/0083298 A1 | 4/2006 | Wang et al. |
| 2006/0233255 A1 | 10/2006 | Ridge et al. |
| 2007/0086521 A1 | 4/2007 | Wang et al. |
| 2007/0268971 A1 | 11/2007 | Kato |
| 2008/0159385 A1 | 7/2008 | Joyce et al. |
| 2009/0003445 A1 | 1/2009 | Ying et al. |
| 2009/0067496 A1 | 3/2009 | Ying et al. |
| 2009/0148058 A1 | 6/2009 | Dane et al. |
| 2010/0020871 A1 | 1/2010 | Hannuksela et al. |
| 2010/0316361 A1 | 12/2010 | Jeon et al. |
| 2011/0002397 A1 | 1/2011 | Wang et al. |
| 2011/0170594 A1 | 7/2011 | Budagavi et al. |
| 2012/0189053 A1 | 7/2012 | Chen et al. |
| 2012/0230409 A1 | 9/2012 | Chen et al. |
| 2014/0072031 A1* | 3/2014 | Xiu ............... H04N 19/117 375/240.02 |

FOREIGN PATENT DOCUMENTS

| | | |
|---|---|---|
| JP | 2009540734 A | 11/2009 |
| WO | 2008030067 A1 | 3/2008 |

OTHER PUBLICATIONS

Shen, Q., et al., "Buffer Requirement Analysis and Reference Picture Marking for Temporal Scalable Video Coding", Conference publication, Packet Video 2007, Nov. 12, 2007, pp. 91-97, XP31170603, IEEE.

Wang, Y-K., et al., "On Reference Picture Marking", Joint Collaborative Team on Video Coding (JCT-VC) of ITU-T SG16 WP3 and ISO/IEC JTC1/SC29/WG11, 6th Meeting, Torino, IT, Jul. 14, 2011, pp. 1-3, Version as of Jul. 1, 2011, Document: JTCVC-F462, XP30009485.

Bross, B., et al., "WD4: Working Draft 4 of High-Efficiency Video Coding", Joint Collaborative Team on Video Coding (JCT-VC) of ITU-T SG16 WP3 and ISO/IEC JTC1/SC29/WG11, 6th Meeting, Torino, IT, Jul. 14, 2011, pp. 1-215 Document: JTCVC-F803_d0, XP30009800.

Bross, B., et al., "WD4: Working Draft 4 of High-Efficiency Video Coding", Joint Collaborative Team on Video Coding (JCT-VC) of ITU-T SG16 WP3 and ISO/IEC JTC1/SC29/WG11, 6th Meeting, Torino, IT, Jul. 14, 2011, pp. 1-222, Document: JCTVC-F803_d1, Version as of Aug. 31, 2011, [Retrieved on May 3, 2013], retrieved from the Internet: http://phenix.int-evry.fr/jct/doc_end_user/documents/6_Torino/wg11/JCTVC-F803-v3.zip.

Richardson, I. "The H.264 Advanced Video Compression Standard" Second Edition Published 2010; Wiley, pp. 1-349 Vcodex Limited, UK.

International Standard. "Information technology—Coding of audio-visual objects Part 10: Advanced Video Coding" ISO/IEC 14496-10; Second Edition; Oct. 1, 2004; pp. 1-280.

* cited by examiner

REFERENCE PICTURE LIST HANDLING

RELATED APPLICATIONS

This application is a continuation of prior U.S. patent application Ser. No. 15/715,903 filed 26 Sep. 2017, now U.S. Pat. No. 11,196,990 issued on 7 Dec. 2021, which was a continuation of prior U.S. patent application Ser. No. 13/704,227 filed on 13 Dec. 2012, now U.S. Pat. No. 9,807,386 issued on 31 Oct. 2017, which was the U.S. National Stage of International Application No. PCT/SE2012/051030 filed on 27 Sep. 2012, which claims the benefit of U.S. Provisional Application Ser. No. 61/540,628 filed on 29 Sep. 2011, the disclosures of all of which are each expressly incorporated by reference herein in their entirety.

TECHNICAL FIELD

The present embodiments generally relates to video encoding and decoding, and in particular to reference picture handling in such video encoding and decoding.

BACKGROUND

High Efficiency Video Coding (HEVC) is a new video coding standard currently being developed in Joint Collaborative Team-Video Coding (JCT-VC). JCT-VC is a collaborative project between Moving Picture Experts Group (MPEG) and International Telecommunication Union-Telecommunication Standardization Sector (ITU-T). An HEVC Model (HM) has been defined that includes a number of new tools and is considerably more efficient than H.264/Advanced Video Coding (AVC).

A picture in HEVC is partitioned into one or more slices, where each slice is an independently decodable segment of the picture. This means that if a slice is missing, for instance got lost during transmission, the other slices of that picture can still be decoded correctly. In order to make slices independent, they do not depend on each other. No bitstream element of another slice of the same picture is required for decoding any element of a particular slice.

Each slice contains a slice header which independently provides all required data for the slice to be independently decodable. One example of a data element present in the slice header is the slice address, which is used for the decoder to know the spatial location of the slice. Another example is the slice quantization delta which is used by the decoder to know what quantization parameter to use for the start of the slice. There are many more data elements in the slice header.

HEVC also has mechanisms for handling reference pictures, which are previously decoded pictures to be used for decoding of a current picture. A reference picture in HEVC is a picture in the decoded picture buffer (DPB) that is available for reference by being marked "used for reference. The pictures to be used as reference pictures are included in reference picture lists, which for HEVC is similar to the reference picture list in H.264. The reference picture lists are then used in the decoding process of the current slice in the current picture.

HEVC also defines a temporal_id for each picture, corresponding to the temporal layer that the picture belongs to. Temporal layers are ordered and are used for temporal scalability where higher temporal layers can be removed without affecting the decoding of lower temporal layers. That means that if temporal layer A is higher than temporal layer B, a picture belonging to temporal layer A can use a picture from temporal layer B for prediction but a picture belonging to temporal layer B can not use a picture from temporal layer A for prediction.

In HEVC, it is proposed to use absolute signaling of reference pictures instead of signaling reference picture modifications in a relative way as in previous standards, e.g. H.264. The absolute signaling is realized by signaling what reference pictures to keep to the decoder in a Buffer Description for each picture explicitly or by signaling them through a reference to a Sequence Parameter Set (SPS). The Buffer Description is also referred to as Reference Picture Set (RPS).

Picture Order Count (POC) is used in HEVC to define the display order of pictures and also to identify reference pictures. In the first drafts of HEVC, not only POC was signaled for each reference picture in a Buffer Description but also temporal_id. The values of POC and temporal_id in the Buffer Description must be identical to the values of POC and temporal_id signaled in the slice header of the reference picture to which it is referring. Temporal_id is used during the Buffer Description decoding process for reference pictures that are included in the Buffer Description but not available in the Decoded Picture Buffer (containing decoded pictures) in order to deduce if a picture that is not available or present in the decoding picture buffer has been unintentionally lost or correctly removed. If the reference picture in a Buffer Description has higher temporal_id than the temporal_id of the current picture it is deemed correctly removed and the decoding process can continue, otherwise it is deemed unintentionally lost and the current picture may not be correctly decodable.

It can be noted that the process of deducing whether a missing picture has been unintentionally lost or correctly removed is independent of the actual Buffer Description decoding process and could be performed before or after the Buffer Description decoding process.

Temporal_id is also used in the reference picture list construction process. Reference pictures that belongs to higher temporal layers than the temporal layer of the current picture are not included in reference picture lists of the current picture.

Figure 1:
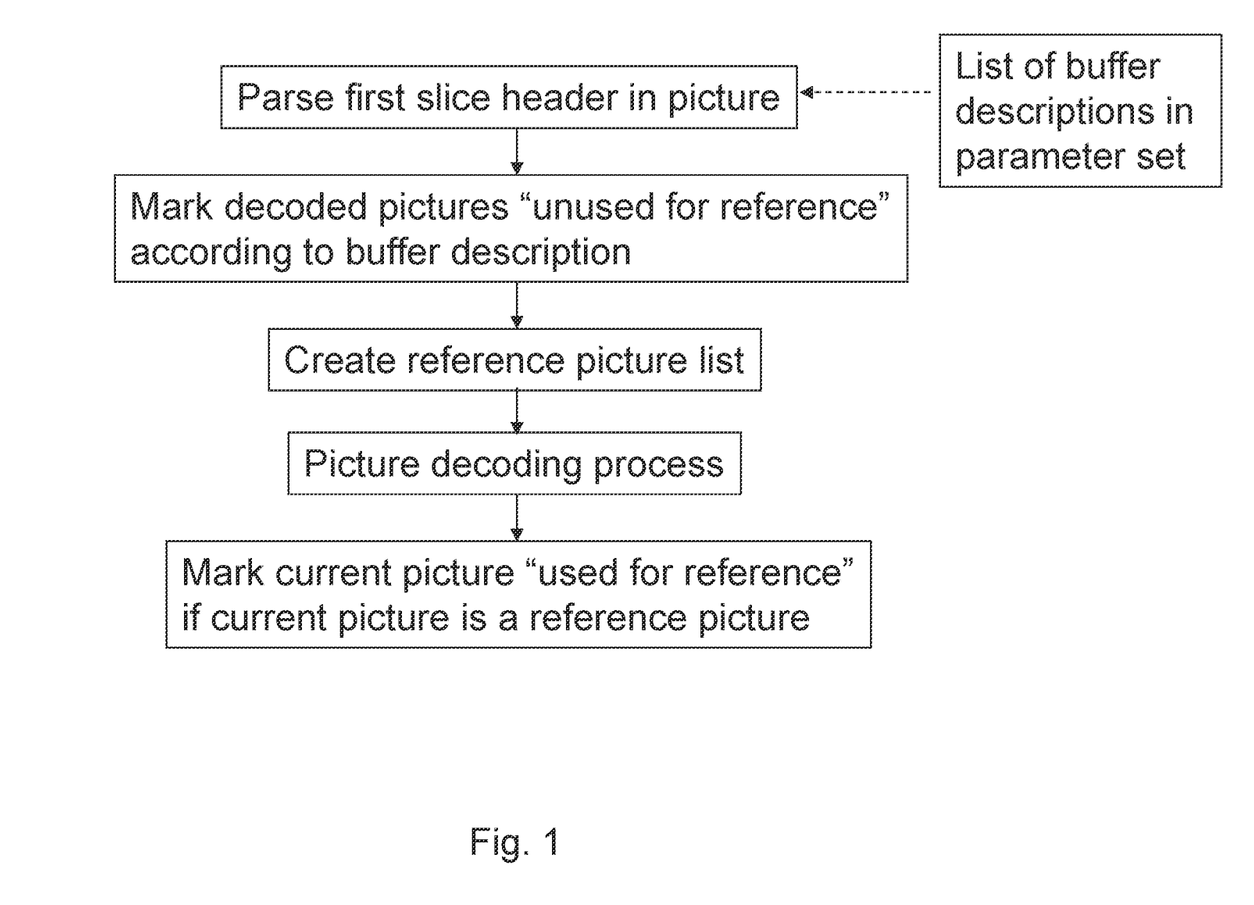
FIG. 1 is a schematic illustration of the decoding process at a high level as proposed in HEVC according to prior art.

A schematic illustration of the decoding process at a high level as proposed in HEVC can be seen in FIG. 1.

SUMMARY

The embodiments of the present invention provide an efficient solution for reference picture handling.

As stated above, in the previous drafts of HEVC, the temporal_id was signaled for each picture in each Buffer Description using up to three bits, depending on the number of temporal layers. For pictures that are not available in the DPB (Decoded Picture Buffer) the temporal_id from the Buffer Description was used to deduce if the picture is correctly removed or unintentionally lost.

When temporal_id is signaled with more than one bit there is a redundancy. For example, when decoding a picture in layer 0 it does not matter if a certain reference picture belongs to temporal layer 1 or 2 to deduce if the picture is correctly removed or unintentionally lost. The only important information is whether it is in a higher layer or not, since that is the information needed to deduce if the picture is correctly removed or unintentionally lost.

In accordance with embodiments of the present invention, a one bit flag set to explicitly indicate to a decoder whether or not the reference picture should be included in a list of reference pictures is provided.

Thus, according to a first aspect of embodiments of the present invention, a method of encoding a representation of a current picture of a video stream of multiple pictures using reference pictures is provided. In the method, a one-bit flag associated with a reference picture in a buffer description for the current picture is encoded, wherein the one-bit flag is set to explicitly indicate to a decoder whether or not the reference picture should be included in a list of reference pictures. The list of reference pictures is indicating which pictures that can be used for references when decoding the current picture.

According to a second aspect of embodiments of the present invention, a method of decoding a representation of a current picture of a video stream of multiple pictures using reference pictures is provided. In the method, a one-bit flag associated with a reference picture in a buffer description for the current picture is decoded. The one-bit flag explicitly indicates to the decoder whether or not the reference picture should be included in a list of reference pictures indicating which pictures that can be used for references when decoding the current picture. The method further comprises the step of using the one-bit flag to determine if the reference picture should be included in the list of reference pictures.

According to a third aspect of embodiments of the present invention, an encoder for encoding a representation of a current picture of a video stream of multiple pictures using reference pictures is provided. The encoder is configured to encode a one-bit flag associated with a reference picture in a buffer description for the current picture and the encoder comprises a processor configured to set the one-bit flag to explicitly indicate to a decoder whether or not the reference picture should be included in a list of reference pictures. The list of reference pictures is indicating which pictures that can be used for references when decoding the current picture.

According to a fourth aspect of embodiments of the present invention, a decoder for decoding a representation of a current picture of a video stream of multiple pictures using reference pictures is provided. The decoder is configured to decode a one-bit flag associated with a reference picture in a buffer description for the current picture. The one-bit flag explicitly indicates to the decoder whether or not the reference picture should be included in a list of reference pictures, wherein the list of reference pictures indicates which pictures that can be used for references when decoding the current picture. Further, the decoder comprises a processor configured to use the one-bit flag to determine if the reference picture should be included in the list of reference pictures.

According to a fifth aspect, an encoder for encoding a representation of a current picture of a video stream of multiple pictures using reference pictures is provided. The encoder is configured to encode a one-bit flag associated with a reference picture in a buffer description for the current picture. The encoder comprises a processor configured to set a one-bit flag according to a comparison between the layer identity of each reference picture and the layer identity of the current picture such that the flag indicates that a reference picture is to be included in the reference picture list if the layer identity of that reference picture is equal to or lower than the layer identity of the current picture and such that the flag indicates that the reference picture is excluded from the reference picture list if the layer identity of the reference picture is higher than the layer identity of the current picture.

According to a sixth aspect a decoder for decoding a representation of a current picture of a video stream of multiple pictures using reference pictures is provided. The decoder is configured to decode a one-bit flag associated with a reference picture in a buffer description for the current picture. The decoder comprises a processor configured to check the one-bit flag for each reference picture in the buffer description where the corresponding reference picture in a decoded picture buffer is missing and if the one-bit flag is indicating that the reference picture is included in the reference picture list, the processor is configured to conclude that the picture is unintentionally lost.

An advantage with the embodiments of the present invention is that given that three bits are spent for each picture in the Buffer description and that can be reduced to one bit, a bit-saving of 2*N bits per slice can be achieved if explicit signaling of Buffer Descriptions is used, where N is the number of reference pictures described in the Buffer Description. Hence, embodiments of the present invention provide a solution where redundancy is removed for signaling whether pictures in the Buffer Description strictly have to be present in the DPB or not. That is, the information about whether a reference picture has been correctly removed or unintentionally lost is indicated by at most one bit instead of up to three bits.

An advantage with the embodiments is that an encoder can choose to exclude certain pictures that belong to the same or lower temporal layer from the reference picture lists by setting the value of the flag to zero, which might remove the need for signaling reference picture list modifications, thus reducing the bitrate and/or reduce the number of bits needed for signaling reference picture index.

DETAILED DESCRIPTION

The embodiments relate to handling of reference picture lists (also referred to as list of reference pictures) which describes which pictures to be used for decoding a current picture. In the embodiments, the encoder indicates explicitly by using a one-bit flag (having two possible values) to a decoder whether or not a reference picture should be included in a reference picture list, wherein the reference picture list indicates which pictures that can be used for reference when decoding the current picture.

Accordingly, the reference picture list is a list of pictures that can be used for reference when decoding a current picture and the reference picture list is stored at the decoder. The pictures are defined by POC. However, the pictures included in the list are not required to be used for reference but pictures not included in the list are not allowed be used for reference when decoding the current picture.

A buffer description, also referred to as Reference Picture Set (RPS), is signalled from the encoder to the decoder in the bitstream and the buffer description comprises reference pictures and a one-bit flag for each reference picture. The one-bit flag indicates explicitly for each reference picture in the Buffer Description whether it should be included in the reference picture list.

Figure 2:
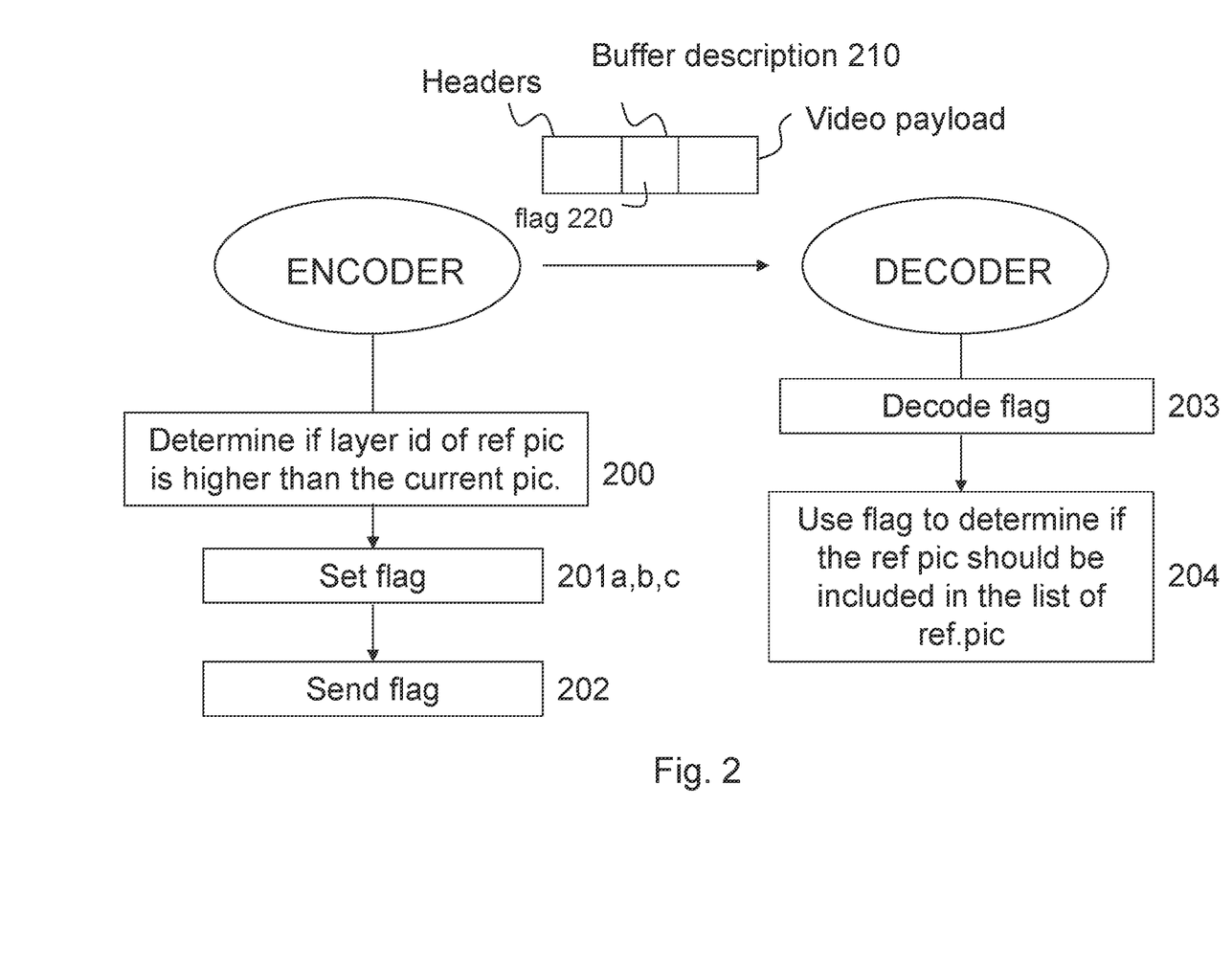
FIG. 2 is a flowchart illustrating the methods in an encoder and in a decoder according to the embodiments of the present invention.

In a method performed by an encoder according to a first aspect a one-bit flag is signaled, wherein the one-bit flag is associated with a reference picture in a buffer description for the current picture. This is illustrated in FIG. 2 wherein the one-bit flag 220 is set 200 to explicitly indicate to a decoder whether or not the reference picture should be included in a list of reference pictures.

According to a one embodiment, the one-bit flag is set 201a such that reference pictures from higher layers compared to the layer of the current picture are not included in the list. Thus, a processor of the encoder is configured to always set the one-bit flag to explicitly indicate that the reference picture should not be included in the reference picture list if the layer identity of the reference picture is higher than the current picture. In this embodiment, it is determined 200 if the layer identity of the reference picture is higher than the layer identity of the current picture, and the one-bit flag is set 201a such that it explicitly indicates that the reference picture should not be included in the reference picture list if the layer identity of the reference picture is higher than the layer identity of the current picture.

According to a further embodiment, the one-bit flag is set 201b such that it explicitly indicates that the reference picture should be included in the reference picture list if at least the layer identity of the reference picture is equal to or lower than the current picture.

That can be done by setting 201b the one-bit flag to "1" to explicitly indicate that one reference picture should be included in the reference picture list if at least the layer identity of the reference picture is equal to or lower than the current picture and setting 201a the one-bit flag to "0" to explicitly indicate that one reference picture should not be included in the reference picture list if at least the layer identity of the reference picture is higher than the current picture.

According to a further embodiment, the one-bit flag is set 201c such that it explicitly indicates that the reference picture should be included in the reference picture list if the layer identity of the reference picture is equal to or lower than the current picture and if another condition is fulfilled. That implies that the reference picture should never be allowed to be included if the layer identity is higher than the layer identity of the current picture but if the layer identity of the reference picture is lower or equal to the layer identifier of the current picture, the encoder can choose according to another condition if the reference picture should be included and set the flag accordingly. An example of such another condition is to exclude pictures with a (base) quantization parameter higher than a specific value.

The one-bit flag 220 associated with a reference picture in a buffer description 210 for the current picture is encoded 202 and sent to the decoder. The one-bit flag 220 can be encoded in a slice header or in a parameter set such as a sequence parameter set or a picture parameter set. The sequence parameter set contains information for more than one picture.

With further reference to FIG. 2, a method of decoding a representation of a current picture of a video stream of multiple pictures using reference pictures is provided. A one-bit flag associated with a reference picture in a buffer description for the current picture is received from the encoder and then decoded 203. The decoder may be configured to decode the one-bit flag in a slice header or in a parameter set such as a sequence parameter set.

The one-bit flag explicitly indicates to the decoder whether or not the reference picture should be included in a list of reference pictures indicating which pictures that can be used for references when decoding the current picture.

The one-bit flag is used 204 to determine whether or not the reference picture should be included in the list of reference pictures.

According to an embodiment, one value of the one-bit flag explicitly indicates that the reference picture should not be included in the reference picture list when the layer identity of the reference picture is higher than the current picture. According to another embodiment, one value of the one-bit flag explicitly indicates that one reference picture should be included in the reference picture list if the layer identity of the reference picture is equal to or lower than the current picture.

These embodiments can be exemplified by that the one-bit flag set to "1" explicitly indicates that one reference picture should be included in the reference picture list and that the one-bit flag set to "0" explicitly indicates that one reference picture should not be included in the reference picture list.

Figure 3:
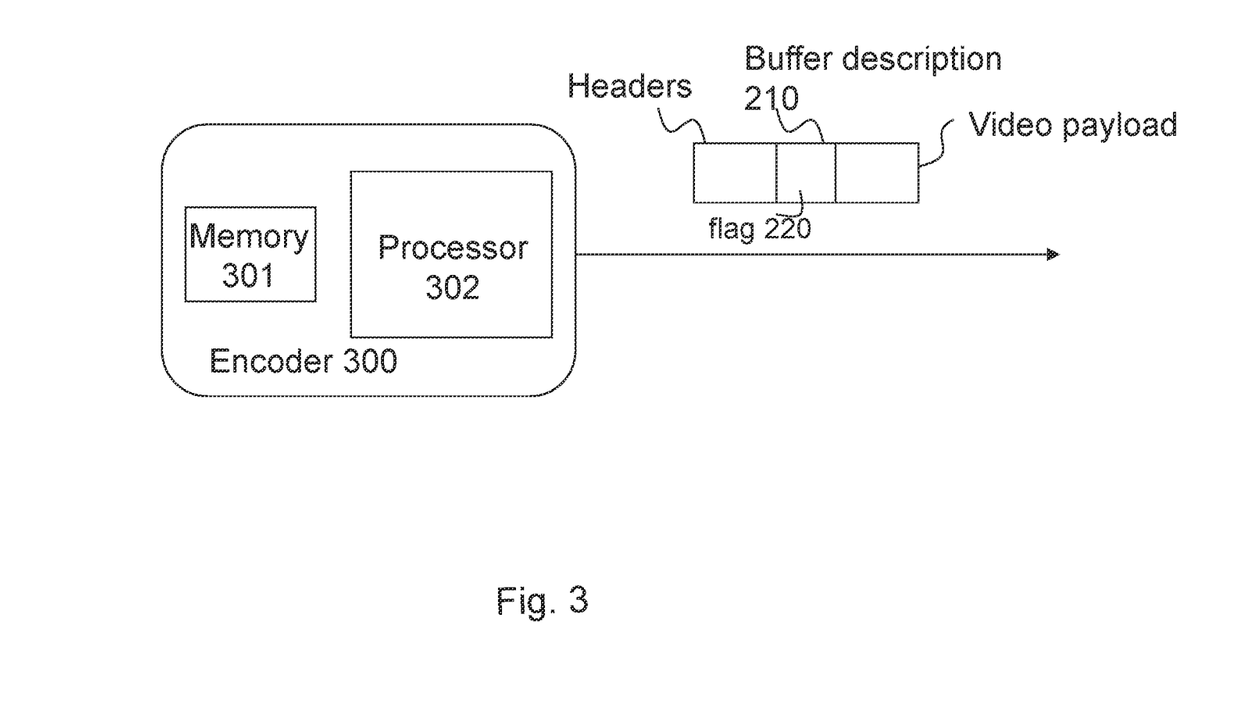
FIGS. 3 and 4 illustrate the encoder and the decoder according to the embodiments of the present invention.

An encoder 300 according to another aspect of the embodiments as illustrated in FIG. 3 is configured to create and signal a buffer description wherein the one-bit flag 220 is set for each reference picture in the buffer description to a value as decided by the encoder 300. That is, the encoder is configured to encode a one-bit flag 220 associated with a reference picture in a buffer description 210 for the current picture, wherein the one-bit flag is set to explicitly indicate to a decoder whether the reference picture should be included in a list of reference pictures indicating which pictures that can be used for decoding the current picture. The encoder 300 comprises a processor 302 configured to create the buffer description and to set the one-bit flag 220 such that it explicitly indicates whether the reference picture should be included in a list of reference pictures or not. The encoder 300 may also comprise a memory 301 for storing picture related information such as information relating to reference pictures and layer information. Furthermore, the encoder 300 may be configured to encode the one-bit flag 220 in a slice header or in a parameter set such as a sequence parameter set.

According to an embodiment, the one-bit flag 220 is set such that reference pictures from higher layers compared to the current picture are not included in the list. Thus, the encoder is restricted to always set the value of the one-bit flag so that a reference picture from a higher temporal layer compared to the layer of the current picture is not included in the reference picture list. That implies that the processor 302 is further configured to determine if the layer identity of the reference picture is higher than the layer identity of the current picture and to set the one-bit flag such that it explicitly indicates that the reference picture should not be included in the reference picture list if the layer identity of the reference picture is higher than the layer identity of the current picture according to this embodiment.

The processor 302 is further configured to set the one-bit flag such that it explicitly indicates that the reference picture should be included in the reference picture list if at least the layer identity of the reference picture is equal to or lower than the current picture.

According to a further embodiment, the processor 302 is configured to set the one-bit flag to "1" to explicitly indicate that one reference picture should be included in the reference picture list and to set the one-bit flag to "0" to explicitly indicate that one reference picture should not be included in the reference picture list.

As mentioned above, the reference picture should never be allowed to be included if the layer identity is higher than the layer identity of the current picture. If the layer identity of the reference picture is lower or equal to the layer identifier of the current picture, the encoder can choose if the reference picture should be included by setting the flag accordingly. In this case, the processor 302 is further configured to set the one-bit flag such that it explicitly indicates that the reference picture should be included in the reference picture list if the layer identity of the reference picture is equal to or lower than the current picture and if another condition is fulfilled.

The decoder uses the information provided by the one-bit flag 220 to create the reference picture list 230. Hence the decoder which performs in accordance with the above described embodiments is configured to decode the slice header. The Buffer Description that includes the one-bit flag 220 for each reference picture in the Buffer Description is decoded from syntax elements in the slice header and/or possibly from the active Sequence Parameter Set. Picture marking is then performed using the Buffer Description.

Figure 4:
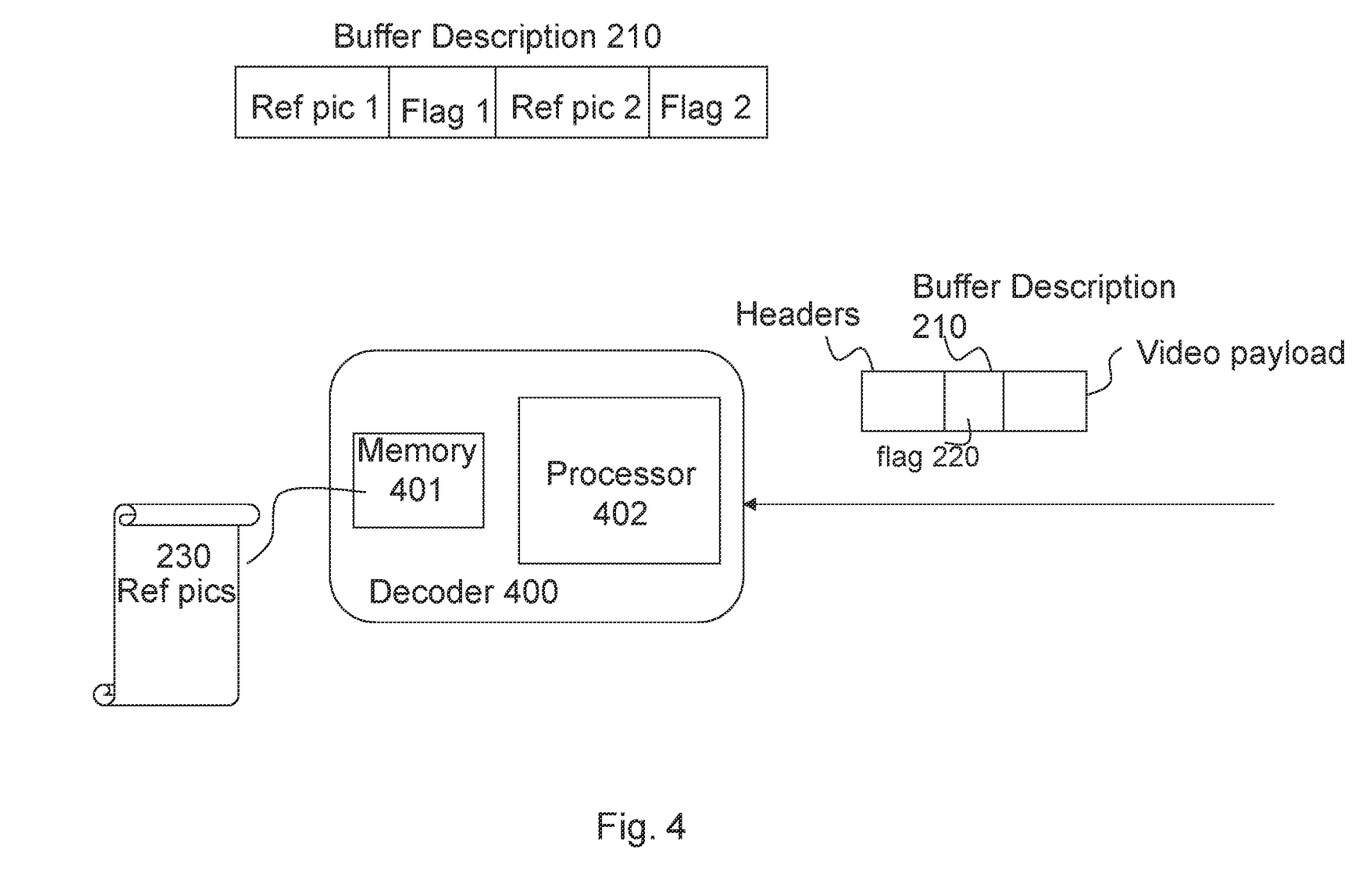

According to a further aspect a decoder for decoding a representation of a current picture of a video stream of multiple pictures using reference pictures is provided as illustrated in FIG. 4. The decoder 400 is configured to receive a one-bit flag 220 for each associated reference picture in a buffer description for the current picture, and the decoder 400 comprises a processor 402 configured to decode the one-bit flag 220 which explicitly indicates to the decoder whether or not the reference picture should be included in a list of reference pictures 230. Further, the processor 402 is configured to use the one-bit flag to determine if the reference picture should be included in the list of reference pictures.

As illustrated in FIG. 4, the buffer description 210, also referred to as reference picture set contains reference pictures ref pic1, ref pic 2 etc and for each reference picture there is a respective one-bit flag flag 1, flag 2 etc which explicitly indicates whether or not the reference pictures should be included in the reference picture list 230.

Further according to an embodiment, the decoder comprises a processor 402 configured to interpret that one value of the one-bit flag explicitly indicates that one reference picture should not be included in the reference picture list. The processor 402 may also be configured to interpret that one value of the one-bit flag explicitly indicates that one reference picture should be included in the reference picture list.

According to another embodiment, wherein each picture belongs to a layer identified by a layer identity, the processor 402 is configured to interpret that the one-bit flag set to "1" explicitly indicates that one reference picture should be included in the reference picture list and the one-bit flag set to "0" explicitly indicates that one reference picture should not be included in the reference picture list.

According to further embodiments, the processor 402 is configured to decode the one-bit flag in a slice header or in a parameter set.

As mentioned in the embodiments described above, the reference pictures which have a layer identity higher than the layer identity of the current picture should never be included in the list of reference pictures. That implies that, for missing pictures, the one-bit flag also can be used by the decoder to determine if a picture is unintentionally lost.

A procedure in the decoder when the flag is used for each picture in the Buffer Description to verify that no picture is unintentionally lost is described below. Thus, a reference picture list is created, including the step of checking the value of the one-bit flag in order to conclude if the reference picture shall be included in the reference picture list or not. For missing pictures, the one-bit flag can also be used to determine if the picture has been unintentionally lost. One value of the one-bit flag indicates that the reference picture have the same or lower layer identity as the current picture which indicates that the missing reference picture is unintentionally lost. Another value of the one-bit flag indicates that the picture may have been correctly removed, i.e. when the missing reference picture has higher layer identity than the current picture. The rest of the decoding process including reference picture list construction is not affected.

With further reference to FIG. 4, according to a fifth aspect of embodiments of the present invention a decoder 400 for decoding a representation of a current picture of a video stream of multiple pictures using reference pictures is provided. The decoder 400 is configured to decode a one-bit flag 220 associated with a reference picture in a buffer description for the current picture. The decoder 400 comprises a processor configured to check a value of the one-bit flag for each reference picture in the buffer description where the corresponding reference picture in a decoded picture buffer is missing and if the value of the one-bit flag is indicating that the reference picture is included in the reference picture list, the processor is configured to conclude that the reference picture is unintentionally lost.

Hence a decoder may be configured to perform the following steps to decode a picture according to embodiments:

The slice header is decoded.

A buffer description that includes the flag for each reference picture in the buffer description is decoded from syntax elements in the slice header and possibly from an active Parameter Set such as Picture parameter set or Sequence parameter set.

Picture marking is performed using the buffer description.

For each picture in the buffer description the flag is in this embodiment used to verify that no picture is unintentionally lost.

A reference picture list is created, including the step of comparing the temporal_id of reference pictures with temporal_id of the current picture in order to conclude if the reference picture shall be included in the reference picture list or not. Accordingly, the flag is used to create the reference picture list by determining which reference pictures that should be included in the reference picture list based on the value of the flag.

The picture is decoded.

According to a further alternative, the reference picture list construction process is changed so that the layer identity, exemplified by the temporal_id of the reference picture is no longer compared to the temporal_id of the current picture to decide if the picture is included in the reference picture list(s) or not. It should be noted that reference pictures having a temporal_id higher than the temporal_id of the current picture is never allowed to be included in the list of reference picture list. Instead said one-bit flag indicates whether the picture has been unintentionally lost or that the picture has been correctly removed is used so that the reference picture is included only if the value of the flag is set to that which represents that the reference picture belongs to the same temporal layer as the current picture or lower.

With further reference to FIG. 3, an encoder 300 for encoding a representation of a current picture of a video stream of multiple pictures using reference pictures is provided. The encoder is configured to encode a one-bit flag 220 associated with a reference picture in a buffer description 210 for the current picture. The encoder comprises a processor 302 configured to set a one-bit flag according to a comparison between the layer identity of each reference picture and the layer identity of the current picture such that the flag indicates that a reference picture is to be included in the reference picture list if the layer identity of that reference picture is equal to or lower than the layer identity of the current picture and such that the flag indicates that the reference picture is excluded from the reference picture list if the layer identity of the reference picture is higher than the layer identity of the current picture.

Hence an encoder may be configured to perform the following steps to encode a picture according to embodiments:

A buffer description is created setting the value of the flag for each picture in the buffer description according to the evaluation of comparing layer identity of the current picture and the reference picture in the buffer description. For pictures with higher layer identities than the current picture, each corresponding flag is set to indicate that the pictures will not be included in the reference picture list. For pictures with equal or lower layer identities than the current picture, each corresponding flag is set to indicate that the pictures will be included in the reference picture list.

The buffer description is encoded.

The picture is encoded.

The encoder 300 may be a High Efficiency Video Coding, (HEVC) encoder e.g. implemented in a mobile terminal. Moreover, the decoder 400 may also be a High Efficiency Video Coding, (HEVC) decoder e.g. implemented in a mobile terminal. It should however be noted that the embodiments are not limited to HEVC.

The processors 302,402 are capable of executing software instructions contained in a computer program stored in a computer program product e.g. in the form of the memories 301,401. The respective computer program product can be a memory being any combination of random access memory (RAM) and read only memory (ROM). The respective memory comprises persistent storage, which, for example, can be any single one or combination of magnetic memory, optical memory, solid state memory or even remotely mounted memory.

What is claimed is:

1. A method of decoding a representation of a current picture in a video stream of multiple pictures using reference pictures, implemented in a processor of a decoder, the method comprising:
    decoding a one-bit flag associated with a reference picture in a buffer description for the current picture; and
    concluding that the picture is unintentionally lost if the corresponding reference picture in a decoded picture buffer is missing and the one-bit flag indicates that the reference picture may be used for reference when decoding the current picture.

2. The method of claim 1, further comprising interpreting the one-bit flag as explicitly indicating that the corresponding reference picture should or should not, be included in the reference picture list based on whether the one-bit flag comprises a second value or a first value, respectively.

3. The method of claim 2, wherein interpreting the one-bit flag based on whether the one-bit flag comprises a second value or a first value comprises:
    interpreting the one-bit flag as explicitly indicating that the corresponding reference picture should be included in the reference picture list responsive to the one-bit flag being set to 1; and
    interpreting the one-bit flag as explicitly indicating that the corresponding reference picture should not be included in the reference picture list responsive to the one-bit flag being set to 0.

4. The method of claim 1, wherein the decoding comprises decoding the one-bit flag in a slice header.

5. The method of claim 1, wherein the decoding comprises decoding the one-bit flag in a parameter set.

6. The method of claim 1, wherein the decoder is a High Efficiency Video Coding (HEVC) decoder.

7. A decoder configured for decoding a representation of a current picture in a video stream of multiple pictures using reference pictures, the decoder comprising:
    a memory configured to store computer-readable program code; and
    processing circuitry configured to access the memory, and to execute the computer-readable program code to cause the decoder to:
        decode a one-bit flag associated with a reference picture in a buffer description for the current picture; and
        conclude that the picture is unintentionally lost if the corresponding reference picture in a decoded picture buffer is missing and the one-bit flag indicates that the reference picture may be used for reference when decoding the current picture.

8. The decoder of claim 7, wherein the processing circuitry is further configured to execute the computer-readable program code to cause the decoder to interpret a first value of the one-bit flag as an indication that a corresponding reference picture should not be included in the reference picture list.

9. The decoder of claim 8, wherein the processing circuitry is further configured to execute the computer-readable program code to cause the decoder to interpret a second value of the one-bit flag as an indication that the corresponding reference picture should be included in the reference picture list.

10. The decoder of claim 9, wherein the processing circuitry is further configured to execute the computer-readable program code to cause the decoder to interpret that the one-bit flag being set to "1" explicitly indicates that the corresponding reference picture should be included in the reference picture list, and that the one-bit flag being set to "0" explicitly indicates that the corresponding reference picture should not be included in the reference picture list.

11. The decoder of claim 7, wherein the processing circuitry is further configured to execute the computer-readable program code to cause the decoder to decode the one-bit flag in a slice header.

12. The decoder of claim 7, wherein the processing circuitry is further configured to execute the computer-readable program code to cause the decoder to decode the one-bit flag in a parameter set.

13. The decoder of claim 7, wherein the decoder is a High Efficiency Video Coding (HEVC) decoder.

14. A non-transitory computer-readable medium comprising instructions stored thereon that, when executed by processing circuitry of a decoder configured for decoding a representation of a current picture in a video stream of multiple pictures using reference pictures, configures the decoder to:
    decode a one-bit flag associated with a reference picture in a buffer description for the current picture; and
    conclude that the picture is unintentionally lost if the corresponding reference picture in a decoded picture buffer is missing and the one-bit flag indicates that the reference picture may be used for reference when decoding the current picture.

15. The non-transitory computer-readable medium of claim 14, wherein the instructions, when executed by the processing circuitry, further configure the decoder to interpret a first value of the one-bit flag as an indication that a corresponding reference picture should not be included in the reference picture list.

16. The non-transitory computer-readable medium of claim 15, wherein the instructions, when executed by the processing circuitry, further configure the decoder to interpret a second value of the one-bit flag as an indication that the corresponding reference picture should be included in the reference picture list.

17. The non-transitory computer-readable medium of claim 16, wherein the instructions, when executed by the processing circuitry, further configure the decoder to interpret that the one-bit flag being set to "1" explicitly indicates that the corresponding reference picture should be included in the reference picture list, and that the one-bit flag being set to "0" explicitly indicates that the corresponding reference picture should not be included in the reference picture list.

18. The non-transitory computer-readable medium of claim 14, wherein the instructions, when executed by the processing circuitry, further configure the decoder to decode the one-bit flag in a slice header.

19. The non-transitory computer-readable medium of claim 14, wherein the instructions, when executed by the processing circuitry, further configure the decoder to decode the one-bit flag in a parameter set.

20. The non-transitory computer-readable medium of claim 14, wherein the decoder is a High Efficiency Video Coding (HEVC) decoder.

* * * * *

UNITED STATES PATENT AND TRADEMARK OFFICE
CERTIFICATE OF CORRECTION

PATENT NO. : 11,825,081 B2
APPLICATION NO. : 17/537710
DATED : November 21, 2023
INVENTOR(S) : Samuelsson et al.

It is certified that error appears in the above-identified patent and that said Letters Patent is hereby corrected as shown below:

On the Title Page

Page 2, item [56], in Column 2, Line 8, delete "JTCVC-F462," and insert -- JCTVC-F462, --, therefor.

Page 2, item [56], in Column 2, Line 13, delete "JTCVC-F803_d0," and insert -- JCTVC-F803_d0, --, therefor.

Page 2, item [56], in Column 2, Line 20, delete "the Internet:" and insert -- Internet: --, therefor.

In the Specification

In Column 1, Line 30, delete "Standardization Sector (ITU-T)." and insert -- (ITU-T) Standardization Sector. --, therefor.

In Column 1, Line 55, delete ""used for reference" and insert -- "used for reference". --, therefor.

In Column 4, Line 56, delete "be used" and insert -- to be used --, therefor.

In Column 5, Line 5, delete "a one" and insert -- one --, therefor.

In Column 7, Line 33, delete "ref pic1," and insert -- ref pic 1, --, therefor.

In Column 7, Line 33, delete "etc" and insert -- etc., --, therefor.

In Column 7, Line 34, delete "etc" and insert -- etc., --, therefor.

Signed and Sealed this
Twenty-third Day of January, 2024

Katherine Kelly Vidal
*Director of the United States Patent and Trademark Office*